US011692664B2

(12) United States Patent
Dodge et al.

(10) Patent No.: US 11,692,664 B2
(45) Date of Patent: Jul. 4, 2023

(54) PIPE INSULATION COUPLING WITH SEALING MECHANISM

(71) Applicants: ZSI, INC., Auburn Hills, MI (US); Mark Schwager, Washington Township, MI (US)

(72) Inventors: Robert Dodge, Birmingham, MI (US); Mark Schwager, Washington Township, MI (US)

(73) Assignee: ZSI, INC., Canton, MI (US)

( * ) Notice: Subject to any disclaimer, the term of this patent is extended or adjusted under 35 U.S.C. 154(b) by 0 days.

(21) Appl. No.: 17/268,392

(22) PCT Filed: Aug. 9, 2019

(86) PCT No.: PCT/US2019/045851
§ 371 (c)(1),
(2) Date: Feb. 12, 2021

(87) PCT Pub. No.: WO2020/036817
PCT Pub. Date: Feb. 20, 2020

(65) Prior Publication Data
US 2021/0180739 A1   Jun. 17, 2021

Related U.S. Application Data

(60) Provisional application No. 62/717,921, filed on Aug. 13, 2018.

(51) Int. Cl.
*F16L 3/00* (2006.01)
*F16L 59/135* (2006.01)

(52) U.S. Cl.
CPC ................... *F16L 59/135* (2013.01)

(58) Field of Classification Search
CPC .................................... F16L 59/135
(Continued)

(56) References Cited

U.S. PATENT DOCUMENTS 1,069,937 A * 8/1913 Goehst .................. F16L 59/135
248/74.1
3,370,815 A   2/1968 Opperthauser
(Continued)

FOREIGN PATENT DOCUMENTS

CN       207364450 U   5/2018
DE    102009034546 A1   7/2011
EP        3290764 A1   3/2018

OTHER PUBLICATIONS

International Search Report and Written Opinion of the International Searching Authority, issued in PCT/US2019/045851, dated Nov. 12, 2019; ISA/US.

(Continued)

*Primary Examiner* — James F Hook
(74) *Attorney, Agent, or Firm* — Harness, Dickey & Pierce, P.L.C.

(57) ABSTRACT

A pipe insulation coupling for supporting a pipe and for coupling adjacent ends of pipe insulation tubing is disclosed. The pipe insulation coupling comprises an outer tube wall, a planar interior wall and a sealing mechanism. The outer tube wall extends along a longitudinal axis. The outer tube wall is split longitudinally from a first end thereof to a second end thereof to define a first body portion and a second body portion. The planar interior wall extends inwardly from the outer tube wall transverse to the longitudinal axis. The planar interior wall includes a center bore for receiving the pipe. The planar interior wall provides an abutment for the adjacent ends of the pipe insulation tubing. The sealing mechanism extends longitudinally between the first and second ends of the outer tube wall for securing the first and second body portions together.

21 Claims, 5 Drawing Sheets

(58) Field of Classification Search
USPC .................................. 138/149, 106, 107
See application file for complete search history.

(56) References Cited

U.S. PATENT DOCUMENTS

| | | | | |
|---|---|---|---|---|
| 4,669,688 A * | 6/1987 | Itoh | .......................... | H02G 3/30 |
| | | | | 24/297 |
| 4,927,103 A * | 5/1990 | Nicholson | ................ | F16L 3/24 |
| | | | | 248/62 |
| 5,873,550 A | 2/1999 | Phillips | | |
| 6,315,006 B1 | 11/2001 | Opperthauser | | |
| 7,053,311 B2 * | 5/2006 | Santanda | ................ | H02G 3/34 |
| | | | | 248/74.1 |
| 7,520,475 B2 | 4/2009 | Opperthauser | | |
| 8,763,648 B2 * | 7/2014 | Senkpiel | .............. | F16L 59/135 |
| | | | | 138/149 |
| 8,833,706 B2 * | 9/2014 | Elsmore | ................ | F16L 3/1075 |
| | | | | 248/62 |
| 2004/0200936 A1 * | 10/2004 | Opperthauser | ....... | F16L 59/135 |
| | | | | 248/62 |
| 2005/0258314 A1 * | 11/2005 | Schilles | .............. | B60R 16/0215 |
| | | | | 248/74.1 |
| 2008/0173773 A1 * | 7/2008 | Opperthauser | ....... | F16L 59/135 |
| | | | | 248/74.1 |
| 2009/0294600 A1 | 12/2009 | Dodge | | |
| 2017/0058944 A1 * | 3/2017 | Bhosale | ................. | F16C 33/20 |

OTHER PUBLICATIONS

International Preliminary Report on Patentability and Written Opinion of the International Searching Authority for PCT/US2019/045851 dated Feb. 16, 2021.

Examination Report dated Mar. 31, 2022, in corresponding Canadian Application No. 3,107,761.

* cited by examiner

PIPE INSULATION COUPLING WITH SEALING MECHANISM

CROSS-REFERENCE TO RELATED APPLICATIONS

This application is a 371 U.S. National Phase of International Application No. PCT/US2019/045851, filed Aug. 9, 2019, which claims priority to U.S. provisional patent application 62/717,921, filed on Aug. 13, 2018. The entire disclosures of the above applications are incorporated herein by reference.

TECHNICAL FIELD

The present invention relates generally to a pipe insulation coupling. More particularly, the invention relates to a pipe insulation coupling that is molded in an open position and has an improved seal for securing a pipe within the insulation coupling.

BACKGROUND OF THE INVENTION

Elastomeric insulation often covers pipes used to transport liquids and gases for commercial and industrial applications such as HVAC and refrigeration, plumbing, paint and food processing, car washing, and even brewing. This insulation protects the pipes from shocks and vibrations, creates a barrier to keep the pipes free of mold and corrosion, and improves the overall efficiency of the pipes. When installed, insulation is traditionally placed on the pipes in sections and is then sealed at the seams between sections with either an adhesive tape or an insulation coupling device. However, adhesive tape is costly and inefficient, and traditional insulation coupling devices can be cumbersome to install.

Many insulation coupling devices such as U.S. Pat. No. 6,315,006 to Opperthauser are molded and distributed in a "closed" position. The end user is therefore required to use a cutting device to open the insulation coupling, and some coupling devices even require the installer to make multiple cuts. Then, once cut and pried open, the insulation couplings generally cannot again be closed without the aid of an additional adhesive or clamp, complicating the process and compromising the vapor barrier, which is crucial to protect against mold and corrosion damage. Ultimately, the process of cutting, prying, and resealing compromises the integrity of the pipes and unnecessarily complicates the installation process.

Other traditional insulation couplings are secured to a channel in a way that makes the pipe and coupling unable to be easily adjusted or maneuvered. For instance, U.S. Pat. No. 7,520,475 to Opperthauser contains a mechanism by which the insulation coupling secures to the channel via its locking feet. Once secured to the channel, the insulation coupling and accompanying pipe cannot easily be manipulated unless the coupling is fully removed. Additionally, coupling systems with locking feet do not allow the pipe insulation coupling to be supplemented with a failsafe such as a metal clamp.

It remains desirable to provide an insulation coupling that can be installed on a channel or any flat surface without requiring a cutting device. It also remains desirable to provide an insulation coupling that can be easily maneuvered on a channel and that can be reinforced with a metal clamp. It further remains desirable to provide an insulation coupling that forms an air-tight seal around the pipe to prevent condensation from forming around the pipe.

SUMMARY OF THE INVENTION

According to one embodiment, there is provided a pipe insulation coupling for supporting a pipe and for coupling adjacent ends of pipe insulation tubing. The pipe insulation coupling comprises an outer tube wall, a first planar interior wall and a sealing mechanism. The outer tube wall extends along a longitudinal axis between a first end and a second end. The outer tube wall is split longitudinally from the first end to the second end to define a first body portion and a second body portion. The first planar interior wall extends inwardly from the outer tube wall transverse to the longitudinal axis between the first and second ends. The first planar interior wall includes a center bore for receiving the pipe. The first planar interior wall provides an abutment for the adjacent ends of the insulation tubing. The sealing mechanism extends longitudinally between the first and second ends of the outer tube wall for securing the first and second body portions together to retain the pipe and adjacent ends of insulation tubing. The sealing mechanism comprises an outward sealing face at an end of the first body portion and an inward sealing face at an end of the second body portion. When the pipe insulation coupling and the pipe insulation tubing are installed on the pipe, the sealing mechanism forms an air-tight seal to prevent air from entering the pipe insulation coupling.

According to another embodiment, there is provided a pipe insulation coupling for coupling adjacent ends of pipe insulation tubing and for supporting a pipe and the pipe insulation tubing along a channel having a slot. The pipe insulation coupling comprises an outer tube wall, a planar interior wall, a sealing mechanism and a base structure. The outer tube wall extends along a longitudinal axis between a first end and a second end. The outer tube wall is split longitudinally from the first end to the second end to define a first body portion and a second body portion. The planar interior wall extends inwardly from the outer tube wall transverse to the longitudinal axis between the first and second ends. The planar interior wall includes a center bore for receiving the pipe. The planar interior wall provides an abutment for the adjacent ends of the insulation tubing. The sealing mechanism extends longitudinally between the first and second ends of the outer tube wall for securing the first and second body portions together to retain the pipe and adjacent ends of insulation tubing. The base structure is integrally secured to the outer tube wall. The base structure includes a horizontal planar face and a pair of rigid seating tabs extending generally vertically from the horizontal planar face. The horizontal planar face rests on the channel and the seating tabs extend into the slot of the channel when the pipe insulation coupling is mounted onto the channel.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF EXAMPLE EMBODIMENTS

Directional references employed or shown in the description, figures or claims, such as top, bottom, upper, lower, upward, downward, lengthwise, widthwise, left, right, and the like, are relative terms employed for ease of description and are not intended to limit the scope of the invention in any respect. For example, the figures illustrate pipe insulation coupling that may be mounted onto a channel or any flat surface. It will be readily apparent that the pipe insulation couplings according to the present disclosure may be mounted in any direction.

Figure 1:
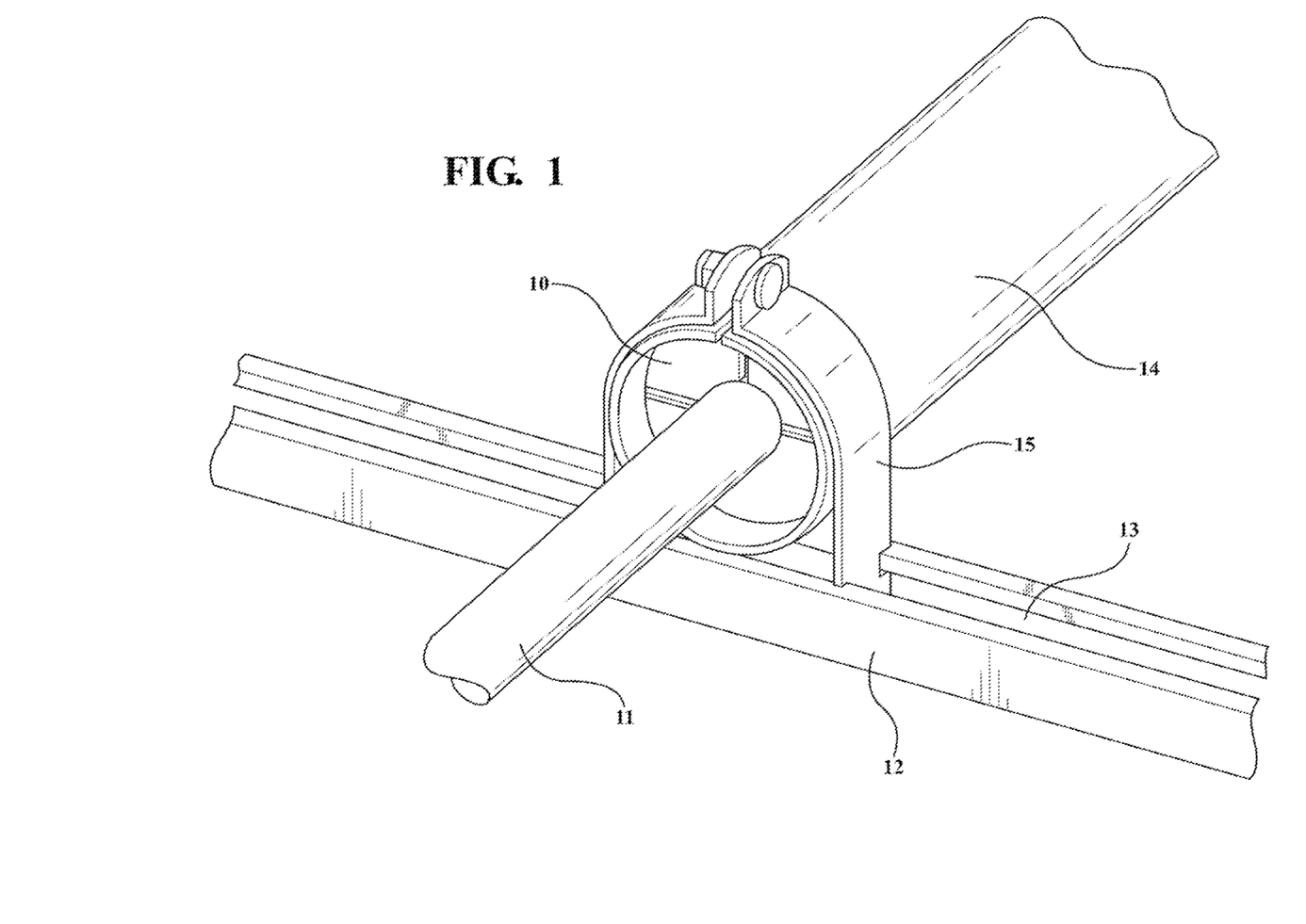
FIG. 1 is a perspective view showing a pipe insulation coupling in accordance with one embodiment of the present disclosure affixed to an elongated pipe, seated in a channel, and secured with a metal clamp for subsequent installation of adjacent sections of insulation along the pipe.

FIGS. 1-7 illustrate one embodiment of a pipe insulation coupling 10. Referring to FIG. 1, the pipe insulation coupling 10 is set in a slot 13 of a channel 12 and affixed to support an elongated pipe 11 commonly used in commercial or industrial applications. A traditional metal clamp 15 is placed around the pipe insulation coupling 10 and is mounted on the channel 12 to secure the pipe insulation coupling 10 along the channel 12. Adjacent ends of pipe insulation tubing 14 are positioned directly against opposing anterior and posterior ends of the pipe insulation coupling 10 to create continuous insulation and a vapor barrier along the pipe 11.

Referring to FIGS. 2, 3, 4, and 6, the pipe insulation coupling 10 includes an outer tube wall 22 and a base structure 16. The outer tube wall 22 extends along a longitudinal axis 33 between a first end 37 and a second end 38 and is supported by and integrally secured to the base structure 16.

Figure 2:
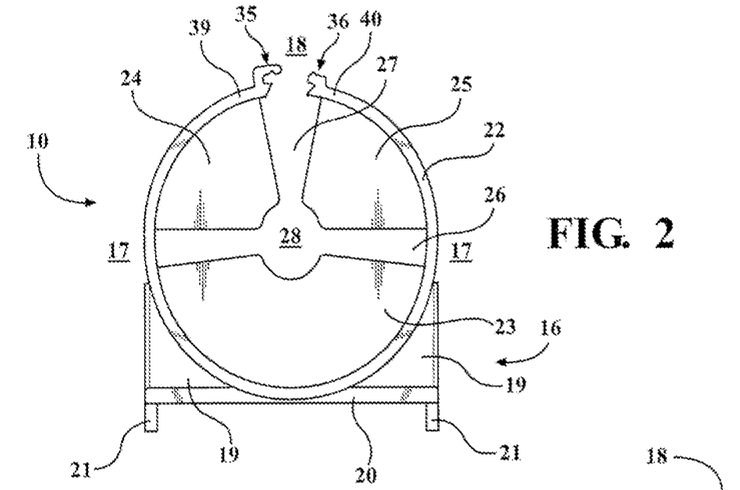
FIG. 2 is an end view of the pipe insulation coupling of FIG. 1.
Figures 3, 4:
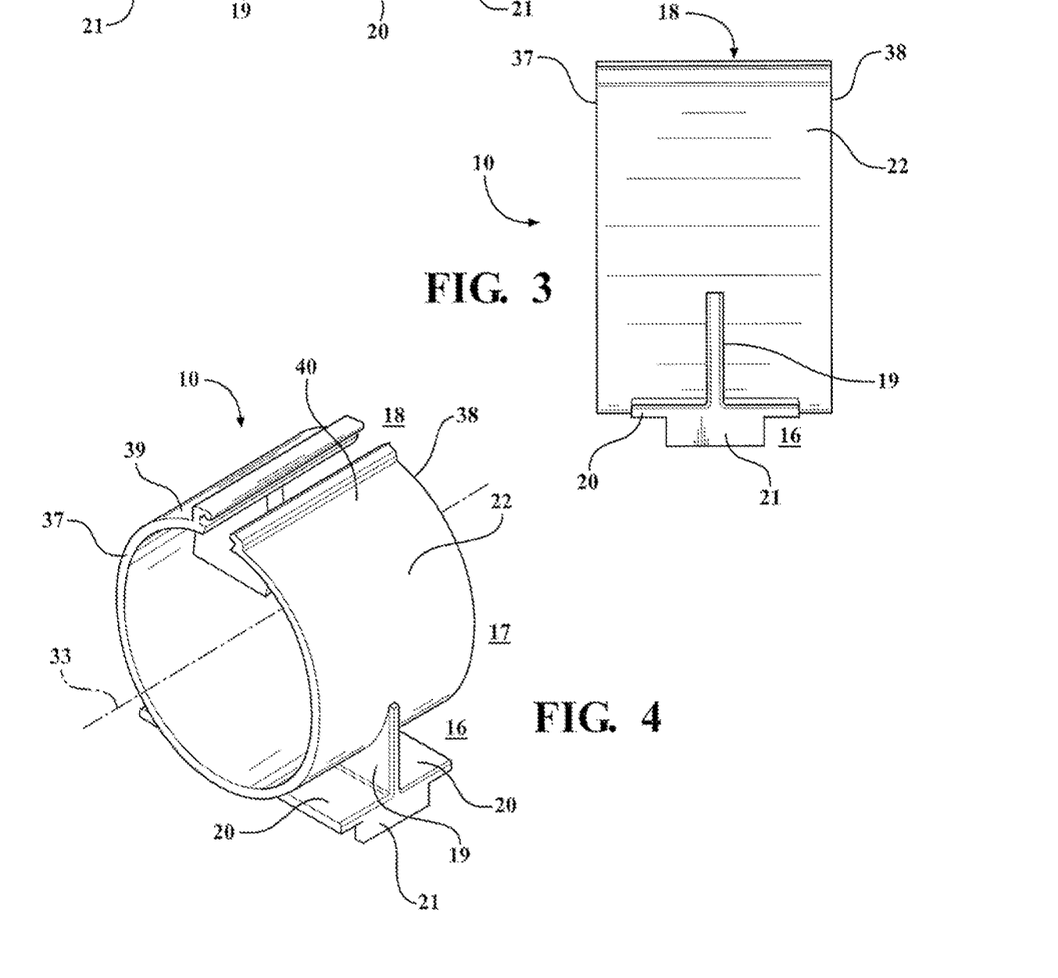
FIG. 3 is a side elevation view of the pipe insulation coupling of FIG. 1.
FIG. 4 is a perspective view of the pipe insulation coupling of FIG. 1.
Figure 5:
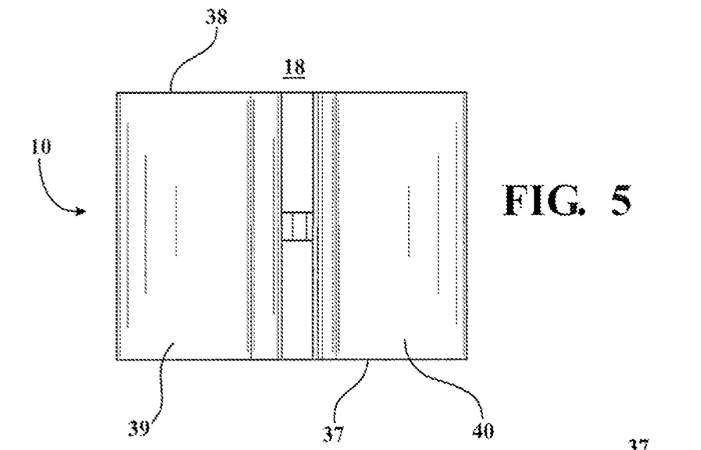
FIG. 5 is a top view of the pipe insulation coupling of FIG. 1.
Figure 6:
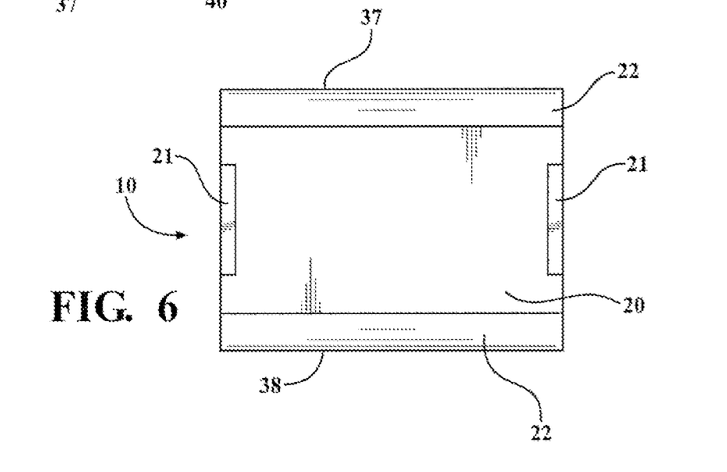
FIG. 6 is bottom view of the pipe insulation coupling of FIG. 1.

Referring to FIGS. 2, 4 and 5, the outer tube wall 22 is split longitudinally from the first end 37 to the second end 38 to define a first body portion 39 and a second body portion 40. A sealing mechanism 18 extends longitudinally between the first 37 and second 38 ends of the outer tube wall 22 for securing the first 39 and second 40 body portions together to retain the pipe 11 and adjacent ends of the insulation tubing 14.

Referring to FIG. 2, the pipe insulation coupling 10 includes a planar interior wall 23 extending inwardly from the outer tube wall 22 transverse to the longitudinal axis 33 substantially midway between the first 37 and second 38 ends. The planar interior wall 23 includes a center bore 28 for receiving the pipe 11. The planar interior wall 23 provides an abutment or stop for adjacent ends of the pipe insulation tubing 14. The pipe insulation coupling 10 also includes a first tab 24 extending inwardly from the first body portion 39 to the center bore 28 and a second tab 25 extending inwardly from the second body portion 40 to the center bore 28. The planar interior wall 23 is separated from both the first tab 24 and the second tab 25 by a linear slot 26 extending from each side of the outer tube wall 22 to the center bore 28. Similarly, when the outer tube wall 22 is in the open position, the first tab 24 is separated from the second tab 25 by a slot 27 extending from the sealing mechanism 18 downward to the center bore 28. The outer tube wall 22 includes living hinges 17 adjacent the linear slot 26.

Referring to FIGS. 2-4, the base structure 16 includes a horizontal planar face 20 and pair of seating tabs 21 that extend vertically downwardly from opposite lateral ends of the horizontal planar face 20. The horizontal planar face 20 provides a surface sufficient for the pipe insulation coupling 10 to rest comfortably against the top surface of the channel 12. The width of each tab 21 generally corresponds to the width of the slot 13 of the channel 12. The seating tabs 21 therefore facilitate proper positioning and stabilization of the pipe insulation coupling 10 on the channel 12. Additionally, the seating tabs 21 allow the pipe insulation coupling 10 to readily move across the channel 12 for easy positioning. The base structure 16 also includes vertical planar faces 19 extending from the horizontal planar face 20 to each side of the outer tube wall 22. The outer profile shape of the vertical planar faces 19 and the outer tube wall 22 contours to the metal clamp 15 to ensure the pipe insulation coupling 10 is fully encased by the metal clamp 15 and secured to the channel 12 when installation is completed.

Figure 7:
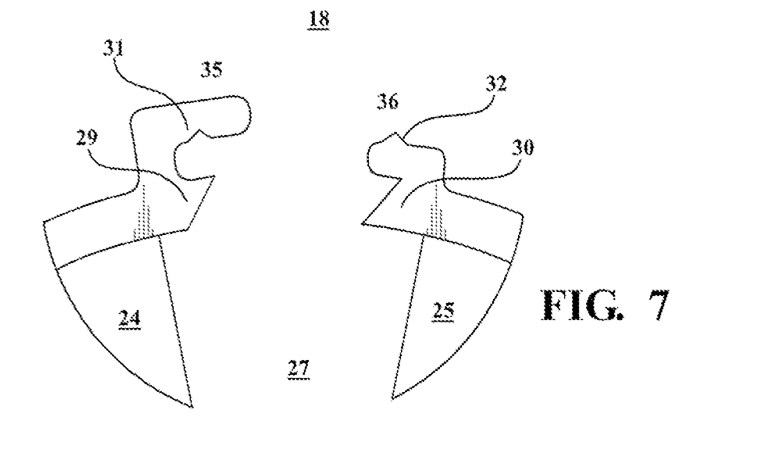
FIG. 7 is an enlarged fragmentary end view of the sealing mechanism from the pipe insulation coupling of FIG. 1.

Referring to FIG. 7, the sealing mechanism 18 includes a female clip member 35 and a male clip member 36 that are complimentarily in shape to provide a tight, secure fit. The female clip member 35 includes an outward sealing face 29 and an inward clip detent 31, and the male clip member 36 includes an inward sealing face 30 and an outward clip feature 32.

Referring to FIG. 2, flexing of the outer tube wall 22 at the living hinges 17 allows the first tab 24 and the second tab 25 to separate at the sealing mechanism 18 and swing outward laterally to allow for easy insertion of the pipe 11. After the pipe 11 is satisfactorily inserted into the center bore 28, the female clip member 35 and the male clip member 36 reversibly couple to lock the first tab 24 to the second tab 25, thereby ensuring the pipe 11 will remain cradled in the center bore 28. When installation is complete, the pipe insulation coupling 10 creates a vapor barrier between the adjacent ends of the pipe insulation tubing 14 and around the pipe 11 to help ensure the integrity and efficiency of the pipe 11. In other words, the pipe insulation coupling 10 forms an air-tight seal around the pipe 11 to prevent air from entering the pipe insulation coupling 10 and reduce condensation from forming around the pipe 11. Additional security is ultimately added by supplementing the pipe insulation coupling 10 with the metal clamp 15.

The pipe insulation coupling 10 is molded with the outer tube wall 22 in the open position and with the sealing mechanism 18 unsecured, as illustrated in FIGS. 2 and 4, which saves the installer from having to use a cutting device to open the pipe insulation coupling 10, thereby improving the overall ease of installation of the pipe insulation coupling 10.

FIGS. 8-14 illustrate another embodiment of a pipe insulation coupling 41. The pipe insulation coupling 41 includes an outer tube wall 42 and a base structure 43. The outer tube wall 42 extends along a longitudinal axis 44 between a first end 45 and a second end 46 and is supported by and integrally secured to the base structure 43. The outer tube wall 42 is split longitudinally from the first end 45 to the second end 46 to define an first body portion 47 and a second body portion 48. A sealing mechanism 49 extends longitudinally between the first 45 and second 46 ends of the outer tube wall 42 for securing the first 47 and second 48 body portions together to retain the pipe 11 and adjacent ends of the insulation tubing 14.

Figures 8, 9, 10:
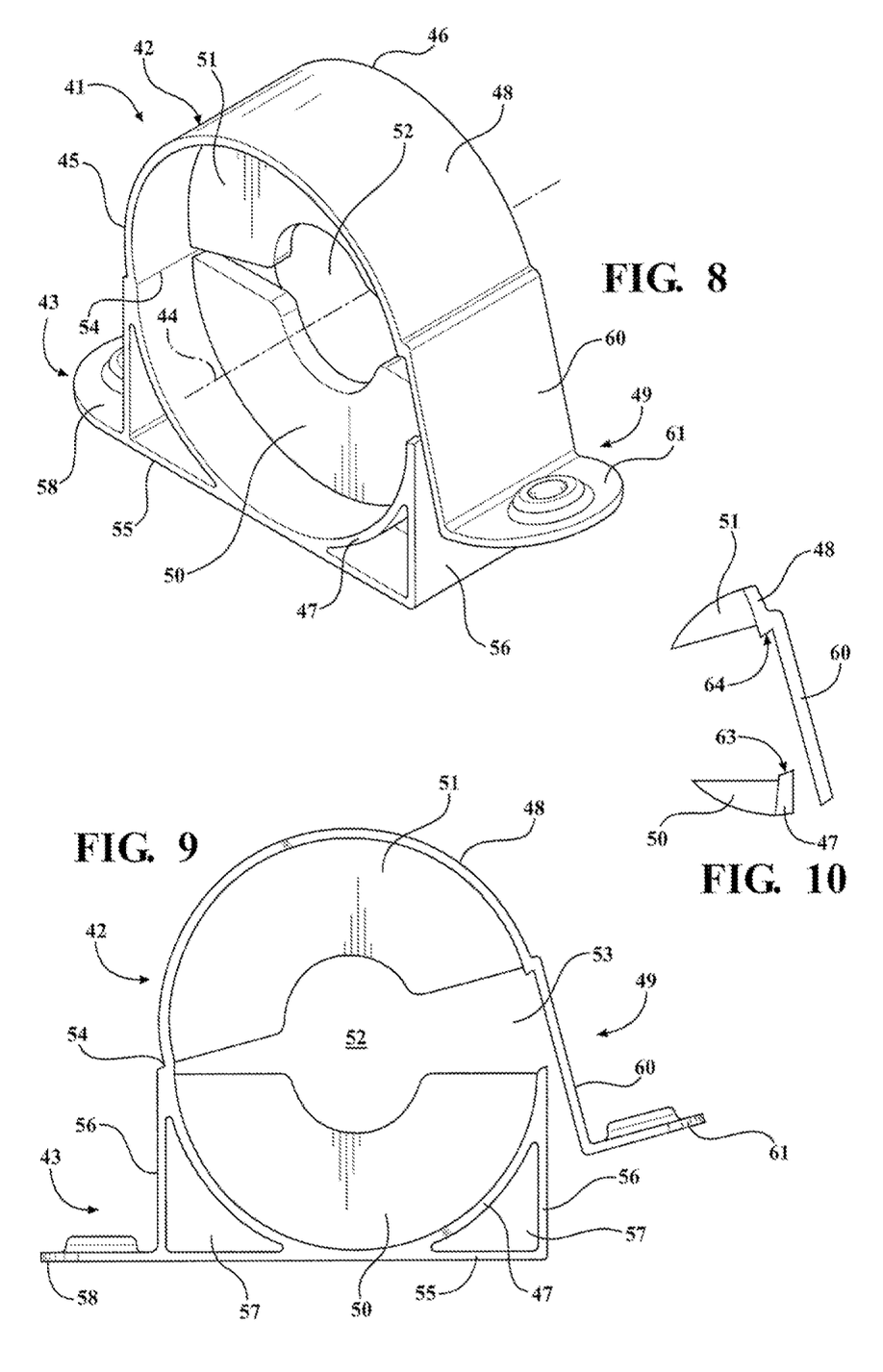
FIG. 8 is a perspective view of a pipe insulation coupling in accordance with another embodiment of the present invention.
FIG. 9 is an end view of the pipe insulation coupling of FIG. 8.
FIG. 10 is an enlarged fragmentary end view of the sealing mechanism from the pipe insulation coupling of FIG. 8.
Figure 11:
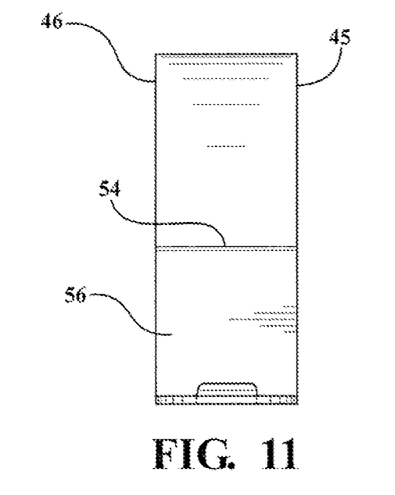
FIG. 11 is a side elevation view of the pipe insulation coupling of FIG. 8.
Figure 12:
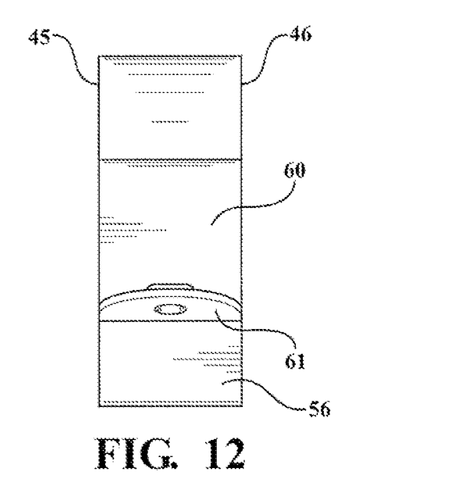
FIG. 12 is a side elevation view illustrating the sealing mechanism of the pipe insulation coupling of FIG. 8.
Figure 13:
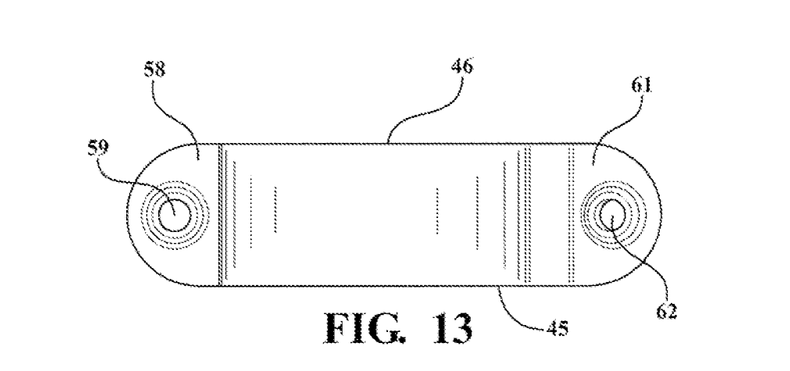
FIG. 13 is a top view of the pipe insulation coupling of FIG. 8.
Figure 14:
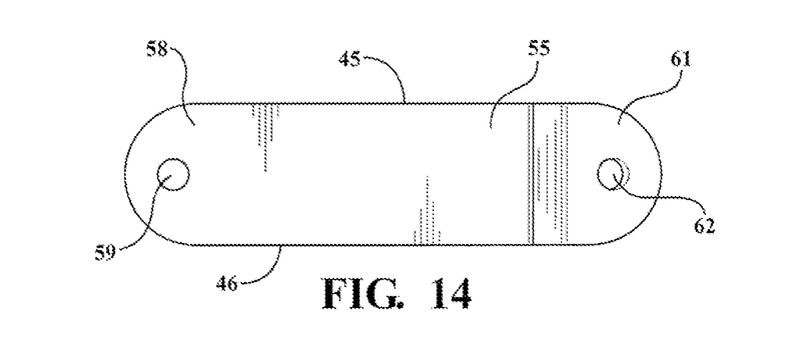
FIG. 14 is a bottom view of the pipe insulation coupling of FIG. 8.

Referring to FIGS. 8 and 9, the pipe insulation coupling 41 includes an first planar interior wall 50 extending inwardly from the first body portion 47 of the outer tube wall 42 transverse to the longitudinal axis 44 substantially midway between the first 45 and second 46 ends. The pipe insulation coupling 41 also includes a second planar interior wall 51 extending inwardly from the second body portion 48 of the outer tube wall 42 transverse to the longitudinal axis 44 substantially midway between the first 45 and second 46 ends. The first 50 and second 51 planar interior walls include a center bore 52 for receiving the pipe 11. The first 50 and second 51 planar interior walls also provide an abutment or stop for adjacent ends of the pipe insulation tubing 14. When the outer tube wall 42 is in the open position, the first planar interior wall 50 is separated from the second planar interior wall 51 by a slot 53. The outer tube wall 42 includes a living hinge 54 adjacent a narrow end of the slot 53.

Referring to FIGS. 8, 9, 13 and 14, the base structure 43 includes a horizontal wall 55, a pair of vertical walls 56 that extend upwardly from opposite lateral ends of the horizontal wall 55, and vertical planar faces 57 extending between the horizontal wall 55, the vertical walls 56, and each side of the outer tube wall 42. The base structure 43 also includes a horizontal mounting tab 58 extending from the horizontal wall 55 below the living hinge 54. The horizontal mounting tab 58 includes a mounting aperture 59.

The sealing mechanism 49 includes a flange 60 extending downwardly from the second body portion 48 of the outer tube wall 42 and a locking tab 61 extending generally perpendicular to the flange 60. The locking tab 61 includes a locking aperture 62. Referring to FIG. 10, the sealing mechanism 49 also includes an outward sealing face 63 at the end of the first body portion 47 and an inward sealing face 64 at the end of the second body portion 48.

Referring to FIG. 9, flexing of the outer tube wall 42 at the living hinge 54 allows the second planar interior wall 51 to swing outward away from the first planar interior wall 50 to allow for easy insertion of the pipe 11. After the pipe 11 is satisfactorily inserted into the center bore 52, the second body portion 48 may be rotated toward the first body portion 47 to close the pipe insulation coupling 41 around the pipe 11 so that the flange 60 is flush against the adjacent vertical wall 56 of the base structure 43 and the outward sealing face 63 is in contact with the inward sealing face 64. Fasteners (not shown) may be inserted into the mounting aperture 59 and the locking aperture 62 to secure the pipe insulation coupling 41 to any flat surface. Fastening the locking aperture 62 to the flat surface also locks the first 47 and second 48 body portions together, thereby ensuring the pipe 11 will remain cradled in the center bore 52 and also ensuring that the outward sealing face 63 maintains contact with the inward sealing face 64. When installation is complete, the pipe insulation coupling 41 creates a vapor barrier between the adjacent ends of the pipe insulation tubing 14 and around the pipe 11 to help ensure the integrity and efficiency of the pipe 11. In other words, the pipe insulation coupling 41 forms an air-tight seal around the pipe 11 to prevent air from entering the pipe insulation coupling 10 and reduce condensation from forming around the pipe 11. The pipe insulation coupling 41 does not require a metal strap or clamp to secure the coupling 41 into place.

The pipe insulation coupling 41 is molded with the outer tube wall 42 in the open position, as illustrated in FIGS. 8 and 9, which saves the installer from having to use a cutting device to open the pipe insulation coupling 41, thereby improving the overall ease of installation of the pipe insulation coupling 41.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A pipe insulation coupling for supporting a pipe and for coupling adjacent ends of pipe insulation tubing, the pipe insulation coupling comprising:
   an outer tube wall extending along a longitudinal axis between a first end and a second end, wherein the outer tube wall is split longitudinally from the first end to the second end to define a first body portion and a second body portion;
   a first planar interior wall extending inwardly from the outer tube wall transverse to the longitudinal axis between the first and second ends, wherein the first planar interior wall includes a center bore for receiving the pipe and the first planar interior wall provides an abutment for the adjacent ends of the pipe insulation tubing; and
   a sealing mechanism extending longitudinally between the first and second ends of the outer tube wall for securing the first and second body portions together to retain the pipe and the adjacent ends of the pipe insulation tubing, wherein the sealing mechanism comprises an outward sealing face at an end of the first body portion and an inward sealing face at an end of the second body portion, wherein when the pipe insulation coupling and the pipe insulation tubing are installed on the pipe, the sealing mechanism forms an air-tight seal to prevent air from entering the pipe insulation coupling; and
   a base structure integrally secured to the outer tube wall, wherein the base structure includes a horizontal planar face and a vertical planar face extending from the horizontal planar face to each side of the outer tube wall, the vertical planar face and the outer tube wall forming an outer profile shape configured to contour to a U-shape clamp placed around the pipe insulation coupling such that the vertical planar face contacts the U-shaped clamp.

2. The pipe insulation coupling of claim 1 wherein the sealing mechanism comprises a female clip member and a male clip member, wherein the female clip member comprises an inward clip detent and the outward sealing face and the male clip member comprises an outward clip detent and the inward sealing face, wherein the female clip member is coupled to the male clip member around the pipe and the adjacent ends of the pipe insulation tubing when the pipe insulation coupling and the pipe insulation tubing are installed on the pipe.

3. The pipe insulation coupling of claim 1 wherein the base structure further includes a pair of rigid seating tabs extending generally vertically from the horizontal planar face, wherein when the pipe insulation coupling is mounted onto a channel having a slot, the horizontal planar face rests on the channel and the seating tabs extend into the slot.

4. The pipe insulation coupling of claim 3 wherein a width of the seating tabs corresponds to a width of the slot in the channel.

5. The pipe insulation coupling of claim 3 wherein the seating tabs facilitate proper positioning and stabilization of the base structure on the channel.

6. The pipe insulation coupling of claim 1 further comprising a first tab extending inwardly from the first body portion of the outer tube wall to the center bore and a second tab extending inwardly from the second body portion of the outer tube wall to the center bore.

7. The pipe insulation coupling of claim 6 further comprising a linear slot separating the first planar interior wall from the first tab and the second tab.

8. The pipe insulation coupling of claim 7 wherein a portion of the outer tube wall adjacent the linear slot comprises a living hinge.

9. The pipe insulation coupling of claim 1 wherein the pipe insulation coupling is molded with the outer tube wall in an open position.

10. The pipe insulation coupling of claim 1 wherein the first planar interior wall extends inwardly from the first body portion of the outer tube wall, wherein the pipe insulation coupling further comprises a second planar interior wall extending inwardly from the second body portion of the outer tube wall transverse to the longitudinal axis between the first and second ends.

11. The pipe insulation coupling of claim 10 wherein when the pipe insulation coupling is in an open position, the pipe insulation coupling further comprises a slot separating the first and second planar interior walls, wherein a portion of the outer tube wall adjacent a narrow end of the slot comprises a living hinge.

12. The pipe insulation coupling of claim 11 wherein the base structure includes a horizontal wall and a pair of vertical walls extending upwardly from opposite lateral ends of the horizontal wall.

13. The pipe insulation coupling of claim 12 wherein the sealing mechanism further comprises:
 a flange extending downwardly from the second body portion of the outer tube wall; and
 a locking tab extending generally perpendicular to the flange, wherein the locking tab includes a locking aperture.

14. The pipe insulation coupling of claim 13 wherein the base structure further comprises a mounting tab extending from the horizontal wall below the living hinge, wherein the mounting tab includes a mounting aperture.

15. A pipe insulation coupling for coupling adjacent ends of the pipe insulation tubing and for supporting a pipe and the pipe insulation tubing along a channel having a slot, the pipe insulation coupling comprising:
 an outer tube wall extending along a longitudinal axis between a first end and a second end, wherein the outer tube wall is split longitudinally from the first end to the second end to define a first body portion and a second body portion;
 a planar interior wall extending inwardly from the outer tube wall transverse to the longitudinal axis between the first and second ends, wherein the planar interior wall includes a center bore for receiving the pipe and the planar interior wall provides an abutment for the adjacent ends of the pipe insulation tubing;
 a sealing mechanism extending longitudinally between the first and second ends of the outer tube wall for securing the first and second body portions together to retain the pipe and the adjacent ends of the pipe insulation tubing; and
 a base structure integrally secured to the outer tube wall, wherein the base structure includes a horizontal planar face, a vertical planar face extending from the horizontal planar face to each side of the outer tube wall, the vertical planar face and the outer tube wall forming an outer profile shape configured to contour to a U-shaped clamp placed around the pipe insulation coupling such that the vertical planar face contacts the U-shaped clamp and a pair of rigid seating tabs extending generally vertically from the horizontal planar face, wherein the horizontal planar face rests on the channel and the seating tabs extend into the slot of the channel when the pipe insulation coupling is mounted onto the channel.

16. The pipe insulation coupling of claim 15 wherein a width of the seating tabs corresponds to a width of the slot in the channel.

17. The pipe insulation coupling of claim 16 wherein the seating tabs facilitate proper positioning and stabilization of the base structure on the channel.

18. The pipe insulation coupling of claim 15 further comprising a first tab extending inwardly from the first body portion of the outer tube wall to the center bore and a second tab extending inwardly from the second body portion of the outer tube wall to the center bore.

19. The pipe insulation coupling of claim 18 further comprising a linear slot separating the planar interior wall from the first tab and the second tab.

20. The pipe insulation coupling of claim 19 wherein a portion of the outer tube wall adjacent the linear slot comprises a living hinge.

21. The pipe insulation coupling of claim 20 wherein the pipe insulation coupling is molded with the outer tube wall in an open position.

* * * * *

UNITED STATES PATENT AND TRADEMARK OFFICE
CERTIFICATE OF CORRECTION

PATENT NO. : 11,692,664 B2  
APPLICATION NO. : 17/268392  
DATED : July 4, 2023  
INVENTOR(S) : Robert Dodge et al.

Page 1 of 1

It is certified that error appears in the above-identified patent and that said Letters Patent is hereby corrected as shown below:

In the Claims

In Claim 1, Column 6, Line 63, delete "U-shape" and insert --U-shaped-- therefor Signed and Sealed this
Eighth Day of October, 2024

Katherine Kelly Vidal
*Director of the United States Patent and Trademark Office*